Figure 1:
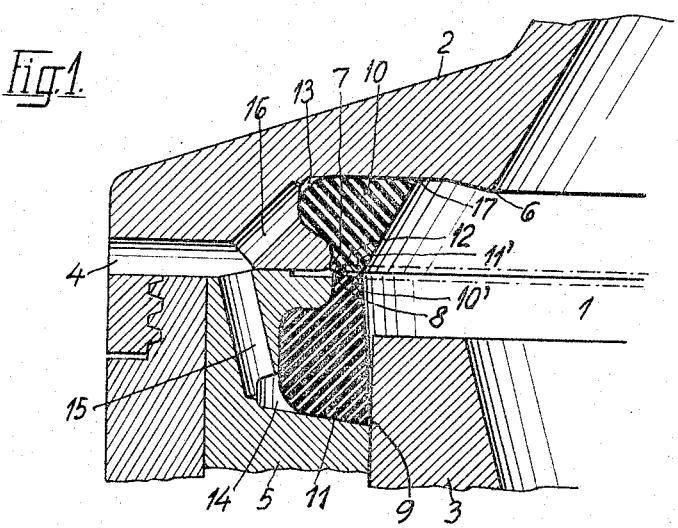

United States Patent Office 3,347,456
Patented Oct. 17, 1967

3,347,456
GASKET ARRANGEMENT FOR A CENTRIFUGE
BOWL WITH PERIPHERAL EXHAUST OPENING
Ejler Kobbernagel, 21 Ryvej, Virum, Denmark
Filed Sept. 8, 1964, Ser. No. 394,708
Claims priority, application Denmark, Sept. 5, 1963,
4,199/63
4 Claims. (Cl. 233—20)

The present invention relates to a gasket arrangement for a centrifuge bowl with a peripheral exhaust opening which can be closed by a displaceable annular piston, and in which one or more recesses containing gasket rings are situated at the exhaust opening.

In known gasket arrangements of the aforementioned type, the openings of the recesses are generally axially directed. The fastening of the gasket ring in the recess in such embodiment is due to the fact that the recess and the gasket ring have such cross-sectional configurations as to permit the gasket ring to expand after being pressed into the recess. This results in fairly deformable gasket rings which are not very hard-wearing.

Other types of gasket rings have been proposed that are more durable but less flexible than those previously described. These gaskets are normally fastened within recesses by means of wedge-formed annular members having diameters corresponding to the diameters of the gasket rings, or by means of other fasteners the use of which is complicated when interchangeability of the rings is desired.

The present invention was developed to overcome these drawbacks of the known devices. A primary object of the present invention is to provide a gasket arrangement by which the gasket rings are hard-wearing and are so placed in their recesses that they are easily interchangeable, but nevertheless, are safely fastened during operation of the centrifuge without the use of releasable fasteners.

The gasket arrangement according to the present invention is characterized in that the opening of the recess is directed towards the inner part of the centrifuge bowl, so that the gasket ring may be safely secured to the recess only by means of centrifugal force.

Further, the gasket arrangement according to the present invention is characterized in that the cross section of the basket ring extends beyond the cross section of the recess, and that the surface of the gasket ring is directed towards the inner part of the centrifuge bowl and has an increasing diameter in the axial direction towards the exhaust opening.

In this way, it is possible to obtain a sealing surface which is clear of the recess, and it is possible to form the inner surface of the gasket ring as, for instance, a conical surface against which the separated material easily slides during exhaust. Furthermore, it is obtained that the material sliding against this surface and which, by friction, tends to move the gasket ring in the flow direction, in addition acts with a force component in the axial direction away from the exhaust opening, thereby further securing the gasket ring in the recess.

According to the alternative embodiments of the invention, the recess with its corresponding gasket ring may be arranged either in the centrifuge bowl or in the annular piston. This involves a simple construction which especially is appropriate when no great hard-wearing of the material around the exhaust opening is needed.

According to the preferred embodiment of the invention, the recess with its corresponding gasket ring is placed in the centrifuge bowl as well as in the annular piston.

In this way, it becomes possible to place the interchangeable gasket rings in those places where wear takes place in such a way that the sealing surfaces jut out in the exhaust opening, thereby, defining the smallest cross section of the outflowing material.

Finally, the gasket arrangement, according to the invention, is characterized in that the bottom of the recess is connected by channel means to a space of lower pressure, for example, the atmosphere around the centrifuge bowl. Hereby, a build-up of pressure between the gasket ring and the recess is avoided. Such build-up of pressure would possibly be able to press out the gasket ring of the recess when exhausting separated material through the exhaust opening, as a strong relief of static pressure in the centrifuge bowl takes place during exhaust. Furthermore, material which eventually may have penetrated to the space between the gasket ring and the recess is drained off.

Figure 2:
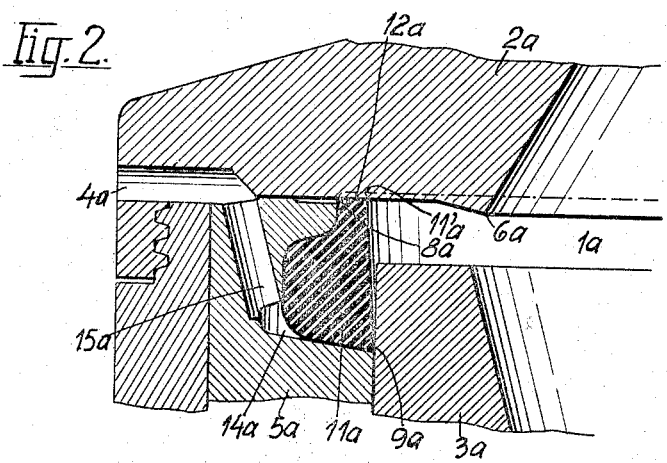
Figure 3:
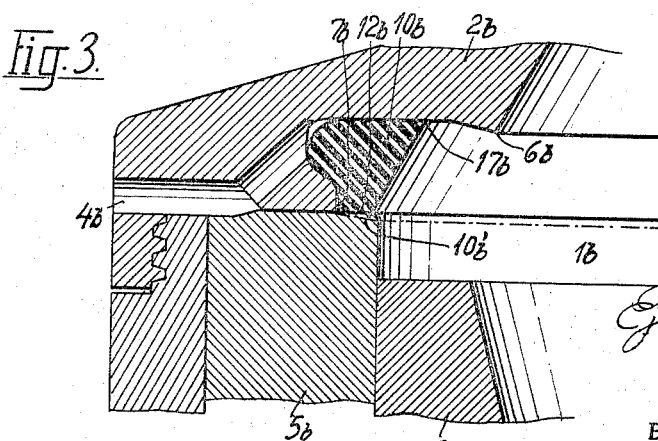

Further details of the invention will be pointed out in connection with the accompanying drawings showing fragmentary axial cross sections around an exhaust opening of a centrifuge bowl, in which:

FIG. 1 is an embodiment of an arrangement according to the invention with two recesses with their corresponding gasket rings, FIG. 2 is another embodiment of an arrangement according to the invention with one recess and one corresponding gasket ring and, FIG. 3 shows a third embodiment of an arrangement according to the invention with one recess and one corresponding gasket ring.

Referring to the drawing, the centrifuge bowl 1 comprises an upper part 2 and a lower part 3 which define an exhaust opening 4, that is situated between the upper part 2 and an annular piston 5 surrounding and displaceable along the lower part 3. In the shown position of the annular piston 5, the exhaust opening 4 is closed so that no flow from the inner space in the centrifuge bowl and out into the exhaust opening 4 can take place.

In the upper bowl part 2, there is formed a recess defined between rims 6 and 7, while in the annular piston 5, there is formed another recess defined between rims 8 and 9. In the first recess, a gasket ring 10 is placed between the rims 6 and 7, while in the other recess, a gasket ring 11 is placed between the rims 8 and 9.

The gasket rings, which are formed of a conventional gasket material, are shown in the deformed configurations which they assume when the centrifuge rotates and when the exhaust opening 4 is closed so that contact is established between the upper part 2 and the annular piston 5, as well as between the gasket rings 10 and 11 at sealing surfaces. Dotted lines 10' and 11' show the shape of the gasket rings 10 and 11 around the sealing surface 12 when the sealing rings are unloaded.

The cross-sectional configurations of the gasket rings in the unloaded state differ from the corresponding recess configurations, and furthermore, in the loaded condition, the rings cooperate with the recesses to form annular spaces 13 and 14, which through channels 15 and 16 are connected to an outer space, for example, through the exhaust opening 4.

The gasket ring 10 is provided with a sharp rim 17 which normally counteracts in-flow of material from the inner part of the centrifuge bowl 1 to the space 13. If, however, such a flow nevertheless takes place, then the channel 16 assures that a pressure relief takes place in the space 13 so that an eventual pressure build-up in the space 13 is avoided which could blow the gasket ring out of its recess during exhausting.

For the same purpose, a sharp rim 9 is provided on the gasket ring 11, the space 14 being connected with exhaust opening 4 via the channel 15. It is important that such an in-flow from the inner of centrifuge bowl 1 to the bottom of the recesses is counteracted. Therefore, the cross section of the gasket ring and of the recess formed in such a way that sealing pressure in the axial direction is greatest between those cooperating surfaces at points 17 and 9 respectively.

FIG. 2 shows an embodiment of an arrangement according to the invention with a single gasket ring.

The lower bowl part 3a and the annular piston 5a with the corresponding gasket ring 11a have not been changed from the embodiment of FIG. 1. Only the upper part 2a appears in another shape, as there is no recess for holding the gasket ring, but only an annular portion 18a for touching the gasket ring.

Interchanging of the gasket ring 11 easily takes place by axial displacing of the annular piston 5 in relation to the lower part 3, as the gasket ring by this can be freely opened after the upper part 2 has been taken away. This is also true for the embodiment of FIG. 1.

FIG. 3 shows another embodiment of the single recess type with corresponding gasket ring. In this embodiment, the gasket ring 10b associated with the upper bowl part has been retained, while there is no gasket ring in connection with the annular piston 5b. This embodiment of a gasket arrangement according to the invention has mostly the same qualities as the prementioned.

I claim:
1. Centrifuge bowl means, comprising
    upper and lower bowl members having adjacent spaced opposed end surfaces containing cavities that cooperate to define a bowl chamber, the cavity of said upper bowl defining an inner wall surface;
    an annular piston member slidably mounted concentrically about said lower bowl member and movable upwardly toward a closed position in which the upper end surface of the piston engages the lower end surface of said upper bowl member to close the space between the upper and lower bowl members, the bore of said piston defining an inner wall surface;
    and compressible gasket sealing means arranged for compression between said piston and upper bowl members when the piston is in the closed position to seal the centrifuge bowl chamber, said gasket means comprising a first gasket ring mounted in a radially facing annular recess contained in the inner wall surface of a first one of said upper bowl and piston members and extending axially toward the other of said upper bowl and piston members for compression thereby, said first member containing also a generally radially outwardly extending passage affording communication between the bottom of the annular recess and atmosphere to prevent pressure build-up beneath the gasket ring, said gasket ring having an axially tapered inner circumference that progressively increases in diameter in the direction of the other of said upper bowl and piston members to define a sharp rim portion adjacent said first member that is pressed into tight sealing engagement with the recess wall by pressure fluid in the bowl chamber.

2. Centrifuge bowl means as defined in claim 1, wherein said gasket sealing means further comprises a second gasket ring mounted in a second annular recess contained in the inner wall surface of the other of said upper bowl and piston members and extending axially for sealing engagement with said first gasket ring, said second gasket ring having an inner circumference that increases in the axial direction of said first gasket ring to define a sharp rim portion adjacent the other of said bowl and piston members, said rim being pressed into sealing engagement with the corresponding recess wall by pressure fluid in said bowl chamber.

3. Apparatus as defined in claim 1 wherein the first member containing said gasket recess is the piston member.

4. Apparatus as defined in claim 1, wherein said first member containing said gasket recess is the upper bowl member.

References Cited

UNITED STATES PATENTS

| 2,091,329 | 8/1937 | Nyrop | 233—20 |
| 2,106,688 | 1/1938 | Bath | 233—20 |
| 2,473,967 | 6/1949 | Orelind | 233—20 X |
| 2,487,364 | 11/1949 | Ortenblad | 233—20 |
| 2,654,536 | 10/1953 | Heckendorf | 233—20 |
| 2,682,992 | 7/1954 | Heckendorf | 233—20 |

FOREIGN PATENTS

| 499,275 | 1/1939 | Great Britain. |
| 173,708 | 12/1960 | Sweden. |

LAVERNE D. GEIGER, *Primary Examiner.*

J. S. MEDNICK, *Assistant Examiner.*